UNITED STATES PATENT OFFICE.

HENRY T. JONES, OF EAST ORANGE, NEW JERSEY.

PROCESS FOR PREPARING RESISTANT MATERIAL AND THE PRODUCT RESULTING THEREFROM.

1,014,882.          Specification of Letters Patent.          Patented Jan. 16, 1912.

No Drawing.          Application filed May 9, 1911. Serial No. 626,069.

*To all whom it may concern:*

Be it known that I, HENRY T. JONES, a citizen of the United States, residing at East Orange, county of Essex, and State of New Jersey, have invented a new and useful Process for Preparing Resistant Material and the Product Resulting Therefrom, of which the following is a specification.

My invention relates to a process for preparing resistant material and to the product resulting therefrom.

It relates particularly to a process or method of treating graphite in solid form, as distinguished from the powdered or comminuted form, one of the objects of the invention being the preparation of a resistant material characterized by increased weight and lower electrical conductivity, as compared with untreated graphite. According to my invention, these results are accomplished by the introduction into the pores or interstices of graphite of a substance of lower electrical conductivity, the said substance being either in a stable, refractory condition capable of withstanding rapid and wide fluctuations of temperature before its introduction, or converted into such a stable, refractory substance by my process, whereby the resulting product will have a higher resistance than untreated graphite and capable of withstanding rapid and wide fluctuations in temperature. This product is particularly adapted for use in rheostats, controllers, electrical heaters and in all forms of resistant devices for regulating the flow of electric current by means of ohmic resistance.

In many resistant devices, especially of the compression type, it has been customary to use a resistant element made up of commercial carbon, consisting of amorphous carbon in a divided state cemented together by a binding agent. In such devices, the resistance is made up of a series of plates or disks of carbon in more or less imperfect contact with each other, so that when pressure is applied to the series, the plates or disks will be brought into more perfect contact with each other, the resistance of the series being thereby lessened according to the degree of pressure applied. While amorphous carbon is normally stable and refractory, when subject to rapid and wide fluctuations in temperature, and only breaks down at exceedingly high temperatures, in such devices, however, the disks of commercial carbon rapidly disintegrate, due to the decomposition of the binder or cementing agent of the carbon owing to the intermittent heating and cooling to which it is subjected in such devices. It, therefore, becomes necessary to constantly renew the plates or disks. As is well known, pure graphite does not contain any binder and is not liable to such disintegration when used as a resistant element in such devices. In its pure state, however, graphite is not suitable as a resistant element, as its conductivity is too high, the conductivity of graphite being from four to five times that of commercial carbon.

One of the objects of my invention is to provide a process for treating graphite, and other similar suitable carbonaceous substances, so as to secure a product of lower conductivity than untreated graphite when used as a resistant element, and that will not disintegrate when so used.

Another object is to provide, as a new article of manufacture, a resistant material comprising substantially pure graphite in solid form into the pores or interstices of which has been introduced a substance of lower electrical conductivity than the untreated graphite, said resistant material having greater weight and lower electrical conductivity than the untreated graphite.

Other objects and advantages will be apparent from the detailed description of my process or method, and the product resulting therefrom, herein set forth.

In the preferred form of my invention, I use graphite in the solid block form, containing about 99.8% pure graphite, as distinguished from the powdered or comminuted form. The graphite may be either in stick or block form, or it may be made into plates or disks such as are used in resistance devices of the compression type.

In carrying out the preferred form of my method, I prepare a suitable mixture of a substance, having a relatively low conductivity, and a suitable fluid medium. Such a mixture may be formed by dissolving North Carolina pine tar in a suitable solvent, preferably carbon disulfid. In this solution I immerse and soak the graphite for a sufficient length of time so that the graphite will become impregnated to the desired degree with the solution. If it is desired to shorten the period of soaking, the solution with the graphite immersed therein may be brought to and kept at the boiling point for several hours, and then allowed to cool. Or a more thorough and uniform impregnation may be secured by the use of vacuum or pressure, or vacuum and pressure, as is well understood by those skilled in the art of effecting impregnation. If the substance, before its introduction into the graphite, be stable and refractory—that is, capable of withstanding rapid and wide fluctuations in temperature without breaking down, it is only necessary to allow the impregnated graphite to dry by heat, or otherwise, so as to drive off the fluid medium. If, however, the impregnating substance yields a stable, refractory residue of lower electrical conductivity, when heated, or the effect of heat is to convert the injected substance into such a stable, refractory condition, then I preferably subject the impregnated graphite to sufficient heat to drive off the fluid medium and convert the impregnating substance into the desired stable, refractory condition.

As an example of the process, I prepared a solution consisting of two parts of North Carolina pine tar, and one part of carbon disulfid. In this solution I immersed a series of eight disks of substantially pure graphite, each disk being in the form of circular plinths one-eighth of an inch thick, having a diameter of 1.15 inches, with a circular central hole one-quarter inch in diameter. The graphite disks were allowed to soak in the solution for about forty-eight hours, when they were wiped and dried at room temperature. The increase in weight was found to be about 11.3%. In view of the small resistance of each disk, the eight treated disks were placed in a pile, one upon the other, and measured for their resistance, readings being taken with various pressures applied to the column of disks. A series of eight other disks were similarly treated, and after being dried, were subjected to a heat of about 1000° F. for a period of about one and one-half hours, the result being to change the tar into amorphous carbon, that is, into a stable, refractory condition. The resistance of these disks was measured in the same manner as the others. The current used in the foregoing tests was 0.05 amperes. The resistances of the various treated and untreated samples of graphite under the different pressures, were as follows:

| Pressure (lbs.). | Resistance in ohms of— | | |
| --- | --- | --- | --- |
| | Untreated graphite. | Treated graphite (unbaked). | Treated graphite (baked). |
| 5.6 | .0315 | .0960 | .0378 |
| 19.7 | .0076 | .0302 | .0160 |
| 33.8 | .0056 | .0182 | .0101 |

By varying the degree of impregnation to which the graphite is subjected, or the amount of the impregnating substance, the resistance of the product may be varied. The more thorough the impregnation of the graphite with such substance, the higher will be the resistance of the resulting product. The process to which the graphite is treated does not seem to change its external appearance, other than that the drying or heating tends to harden it. The resulting product, however, as compared with untreated graphite, is characterized by an increase in weight and by a lower electrical conductivity.

The effect of treating graphite, as hereinbefore described, is to lower the conductivity of the resulting product and increase its resistance—that is, to cut down the electrical cross-section of the graphite. I do not, however, wish to be confined to the combination of the substance of relatively low conductivity herein named with graphite, as my invention in its broadest terms relates not only to the process of lowering the conductivity of similar suitable conducting carbonaceous material by impregnating it in its solid form with another substance of relatively low conductivity, but also to the resulting product after the said carbonaceous material has been treated in accordance with my process or method, whereby the resulting product will be characterized by increased weight or by lower electrical conductivity, or both, as compared with the untreated carbonaceous material. Nor do I wish to be confined to the herein-described method of combining a substance of relatively low conductivity with graphite, for other means may be used for introducing such substance into the pores or interstices of the graphite, without departing from the spirit of my invention.

Having thus described my invention, what I claim as new, and desire to secure by Letters Patent, is:

1. The process of preparing resistant material, consisting in impregnating substantially pure graphite in its solid form with a stable, refractory substance of lower electrical conductivity than the graphite.

2. The process of preparing resistant material, consisting in impregnating a block of graphite with a material yielding a stable, refractory substance of lower electrical conductivity than the graphite, and then converting said material into said stable, refractory substance.

3. The process of preparing resistant material, consisting in first impregnating a block of graphite with a material yielding a stable, refractory substance of lower electrical conductivity than the graphite, and then subjecting the impregnated graphite to heat.

4. The process of preparing resistant material, consisting in first impregnating a block of graphite with a mixture comprising a suitable fluid medium and a material yielding a stable, refractory substance of lower electrical conductivity than the graphite, then raising the impregnated graphite to a temperature sufficient to convert said material into said stable, refractory substance.

5. The process of preparing resistant material, consisting in first impregnating a block of graphite with a mixture comprising a suitable fluid medium, and a substance yielding a stable, refractory residue of lower electrical conductivity than the graphite and then subjecting the impregnated graphite to heat.

6. The process of preparing resistant material, consisting in first soaking a block of graphite in a solution comprising a suitable solvent and a carbonaceous substance of lower electrical conductivity than the graphite to introduce said solution into the pores or interstices of said graphite, then raising the soaked graphite to a temperature sufficient to volatilize the solvent and to carbonize the substance introduced therein.

7. The process of preparing resistant material, said process consisting in first dissolving tar in a suitable solvent, then soaking a block of substantially pure graphite in the solution, and then subjecting the soaked graphite to a temperature sufficient to convert the impregnating material into a stable, refractory substance of lower electrical conductivity than the unimpregnated graphite.

8. As a new article of manufacture, the hereindescribed product consisting of a solid, porous block of substantially pure, uncemented carbon, impregnated with a substance of lower electrical conductivity and characterized by increased weight and lower electrical conductivity as compared with untreated carbon.

9. As a new article of manufacture, the hereindescribed product consisting of a block of substantially pure graphite in solid form, impregnated with a substance of lower electrical conductivity than the graphite and characterized by a lower electrical conductivity as compared with untreated graphite.

10. As a new article of manufacture, the hereindescribed product, consisting of a block of substantially pure graphite in solid form, impregnated with a stable, refractory substance and characterized by increased weight and lower electrical conductivity as compared with untreated graphite.

11. As a new article of manufacture, the hereindescribed product, consisting of a block of substantially pure graphite in solid form, impregnated with a substance of lower electrical conductivity than the graphite and characterized by increased weight and lower electrical conductivity, as compared with untreated graphite.

12. As a new article of manufacture, the hereindescribed product, consisting of a block of substantially pure graphite in solid form, impregnated with a stable, refractory substance of lower electrical conductivity than the graphite and characterized by increased weight and lower electrical conductivity as compared with untreated graphite.

13. As a new article of manufacture, the hereindescribed product, consisting of a block of substantially pure graphite in solid form, impregnated with carbon and characterized by increased weight and lower electrical conductivity as compared with untreated graphite.

In testimony whereof, I sign this specification in the presence of two witnesses.

HENRY T. JONES.

Witnesses:
R. I. MANJER,
ARTHUR G. PIERCE.